US011771982B2

(12) United States Patent
Sparks et al.

(10) Patent No.: US 11,771,982 B2
(45) Date of Patent: Oct. 3, 2023

(54) SYSTEMS AND METHODS FOR AUGMENTED REALITY ROLE PLAYING ENTERTAINMENT

(71) Applicants: Katherine Lynn Sparks, Moore, OK (US); Gavin Joseph Bacon, Norman, OK (US); Mason Dent, Norman, OK (US); Harrison Jack Gilman, Oklahoma Cit6y, OK (US); Dakota Mayo, Norman, OK (US); Arya Ramineedi, Norman, OK (US); William Bradford Sparks, Moore, OK (US); Aidan Jaymes Strother, Norman, OK (US); Emma Wheelbarger, Moore, OK (US); Brent Wheelbarger, Moore, OK (US)

(72) Inventors: Katherine Lynn Sparks, Moore, OK (US); Gavin Joseph Bacon, Norman, OK (US); Mason Dent, Norman, OK (US); Harrison Jack Gilman, Oklahoma Cit6y, OK (US); Dakota Mayo, Norman, OK (US); Arya Ramineedi, Norman, OK (US); William Bradford Sparks, Moore, OK (US); Aidan Jaymes Strother, Norman, OK (US); Emma Wheelbarger, Moore, OK (US); Brent Wheelbarger, Moore, OK (US)

(73) Assignee: Real Tech, LLC., Moore, OK (US)

( * ) Notice: Subject to any disclaimer, the term of this patent is extended or adjusted under 35 U.S.C. 154(b) by 0 days.

(21) Appl. No.: 17/175,230

(22) Filed: Feb. 12, 2021

(65) Prior Publication Data
US 2021/0252391 A1 Aug. 19, 2021

Related U.S. Application Data

(60) Provisional application No. 62/976,593, filed on Feb. 14, 2020.

(51) Int. Cl.
A63F 13/00 (2014.01)
A63F 13/25 (2014.01)
(Continued)

(52) U.S. Cl.
CPC .............. A63F 13/25 (2014.09); G06T 13/40 (2013.01); G06T 19/006 (2013.01); A63F 2300/8082 (2013.01)

(58) Field of Classification Search
CPC ........ A63F 13/20; A63F 13/213; A63F 13/45; A63F 13/53; A63F 13/25; A63F 2300/8082; G06T 13/40; G06T 19/006
See application file for complete search history.

(56) References Cited

U.S. PATENT DOCUMENTS 7,347,019 B1    3/2008  Shaw
8,287,383 B1 * 10/2012  Etter ...................... H04L 67/38
                                                          463/42

(Continued)

Primary Examiner — Dmitry Suhol
Assistant Examiner — Jason Pinheiro
(74) Attorney, Agent, or Firm — Dunlap Codding, P.C.

(57) ABSTRACT

A non-transitory computer readable medium storing computer executable code that when executed by a processor cause the processor to obtain at least one image of a trigger accessory within a video stream, the at least one processor executing an augmented reality game requiring visual input from the trigger accessory to enable a user to play the augmented reality game, identify a trigger icon positioned on the trigger accessory having a configuration selected from a group of configurations dependent upon at least one of a shape and orientation of the trigger icon, apply image analysis to the trigger icon within the image to determine the orientation of the trigger accessory, and execute at least one software module of the augmented reality game dependent upon the configuration of the trigger accessory.

11 Claims, 2 Drawing Sheets

(51) Int. Cl.
*G06T 13/40* (2011.01)
*G06T 19/00* (2011.01)

(56) References Cited

U.S. PATENT DOCUMENTS

| | | | | |
|---|---|---|---|---|
| 8,444,491 B2* | 5/2013 | Bethke | | A63F 13/795 |
| | | | | 705/14.12 |
| 8,469,824 B1* | 6/2013 | Farley | | F41J 5/02 |
| | | | | 434/21 |
| 8,547,401 B2 | 10/2013 | Mallinson et al. | | |
| 8,968,099 B1* | 3/2015 | Hanke | | A63F 13/216 |
| | | | | 463/9 |
| 9,669,296 B1* | 6/2017 | Hibbert | | A63F 13/5378 |
| 9,795,885 B1* | 10/2017 | Kim | | A63F 13/792 |
| 9,861,889 B2* | 1/2018 | Davis | | A63F 13/57 |
| 10,134,229 B2 | 11/2018 | Lyons et al. | | |
| 10,717,005 B2* | 7/2020 | Kornmann | | G07F 17/3227 |
| 2003/0028873 A1* | 2/2003 | Lemmons | | H04N 21/25883 |
| | | | | 348/588 |
| 2006/0105838 A1* | 5/2006 | Mullen | | A63F 13/65 |
| | | | | 463/31 |
| 2009/0285483 A1* | 11/2009 | Guven | | G06Q 30/016 |
| | | | | 345/473 |
| 2010/0151940 A1* | 6/2010 | Borge | | A63F 13/73 |
| | | | | 463/29 |
| 2010/0257252 A1* | 10/2010 | Dougherty | | G06V 10/95 |
| | | | | 709/217 |
| 2011/0214082 A1* | 9/2011 | Osterhout | | G02B 27/017 |
| | | | | 715/773 |
| 2012/0075463 A1* | 3/2012 | Chen | | G01S 11/12 |
| | | | | 348/E5.09 |
| 2012/0086729 A1* | 4/2012 | Baseley | | G06T 19/006 |
| | | | | 345/633 |
| 2012/0190455 A1* | 7/2012 | Briggs | | G06K 19/06037 |
| | | | | 463/42 |
| 2013/0050258 A1* | 2/2013 | Liu | | G06F 3/013 |
| | | | | 345/633 |
| 2013/0278631 A1* | 10/2013 | Border | | G06Q 30/02 |
| | | | | 345/633 |
| 2015/0123965 A1* | 5/2015 | Molyneaux | | G06T 19/20 |
| | | | | 345/419 |
| 2016/0300388 A1* | 10/2016 | Stafford | | A63F 13/69 |
| 2017/0046878 A1* | 2/2017 | Dobslaw | | G06F 3/011 |
| 2018/0197009 A1* | 7/2018 | Severn | | G06F 3/147 |
| 2019/0081848 A1* | 3/2019 | Zou | | A63F 13/213 |
| 2020/0042793 A1* | 2/2020 | Gotow | | G06F 21/62 |
| 2020/0078689 A1* | 3/2020 | Eatedali | | A63F 13/655 |
| 2020/0294313 A1* | 9/2020 | Arroyo Palacios | | A63F 13/25 |
| 2020/0326831 A1* | 10/2020 | Marr | | G06F 3/04815 |
| 2021/0133850 A1* | 5/2021 | Ayush | | G06V 10/945 |
| 2021/0406575 A1* | 12/2021 | Wiggeshoff | | G06T 19/00 |
| 2022/0197393 A1* | 6/2022 | Goodrich | | G06F 3/0482 |

* cited by examiner

SYSTEMS AND METHODS FOR AUGMENTED REALITY ROLE PLAYING ENTERTAINMENT

CROSS REFERENCE TO RELATED APPLICATION INCORPORATION BY REFERENCE STATEMENT

The present patent application claims priority to U.S. Provisional Application No. 62/976,593 titled "SYSTEMS AND METHODS FOR AUGMENTED REALITY ROLE PLAYING ENTERTAINMENT", filed on Feb. 14, 2020, the entire content of which is hereby expressly incorporated herein by reference.

SUMMARY

In one embodiment, a non-transitory computer readable medium storing computer executable code that when executed by a processor cause the processor to: obtain at least one image of a trigger accessory within a video stream, the at least one processor executing an augmented reality game requiring visual input from the trigger accessory to enable a user to play the augmented reality game, identify a trigger icon positioned on the trigger accessory having a configuration selected from a group of configurations dependent upon at least one of a shape and orientation of the trigger icon, apply image analysis to the trigger icon within the image to determine the orientation of the trigger accessory, and execute at least one software module of the augmented reality game dependent upon the configuration of the trigger accessory.

In another embodiment, a non-transitory computer readable medium storing computer executable code that when executed by at least one processor cause the at least one processor to: obtain at least one image of a first trigger accessory within a field of view of a video stream during a period in which the video stream is being obtained by a camera having a field of view directed at the first trigger accessory and the at least one processor is executing an augmented reality game requiring visual input from the first trigger accessory to enable a user to play a game provided by the augmented reality game, the game having a first augmented reality environment associated with the first trigger accessory, and a second augmented reality environment associated with a second trigger accessory; collect and non-transitorily store a first data associated with the user playing the game within the first augmented reality environment; access the first data when the user is playing the game within the second augmented reality environment; and modify the game within the second augmented reality environment based upon the first data.

BRIEF DESCRIPTION OF SEVERAL VIEWS OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings.

DETAILED DESCRIPTION

Figure 1:
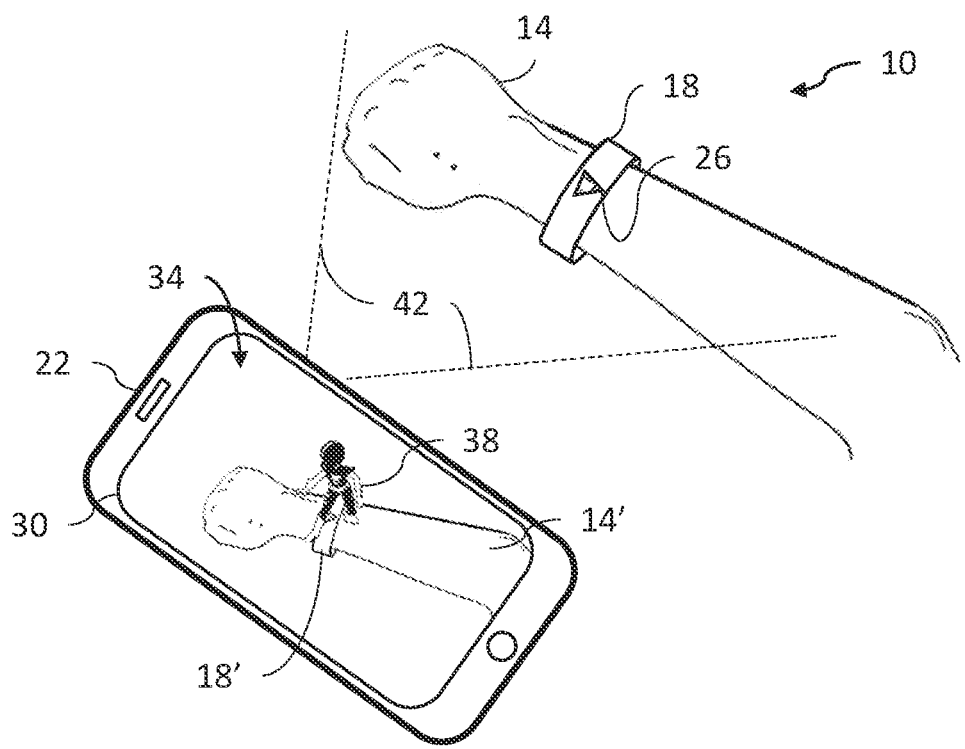
FIG. 1 is an exemplary embodiment of an augmented reality entertainment system having a portable accessory configured to place the augmented reality system in a configuration mode, which may also be referred to herein as a wrist-mode.

Before explaining at least one embodiment of the disclosure in detail, it is to be understood that the disclosure is not limited in its application to the details of construction, experiments, exemplary data, and/or the arrangement of the components set forth in the following description or illustrated in the drawings unless otherwise noted.

The disclosure is capable of other embodiments or of being practiced or carried out in various ways. Also, it is to be understood that the phraseology and terminology employed herein is for purposes of description, and should not be regarded as limiting.

As used in the description herein, the terms "comprises," "comprising," "includes," "including," "has," "having," or any other variations thereof, are intended to cover a non-exclusive inclusion. For example, unless otherwise noted, a process, method, article, or apparatus that comprises a list of elements is not necessarily limited to only those elements, but may also include other elements not expressly listed or inherent to such process, method, article, or apparatus.

Further, unless expressly stated to the contrary, "or" refers to an inclusive and not to an exclusive "or". For example, a condition A or B is satisfied by one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more, and the singular also includes the plural unless it is obvious that it is meant otherwise. Further, use of the term "plurality" is meant to convey "more than one" unless expressly stated to the contrary.

As used herein, qualifiers like "substantially," "about," "approximately," and combinations and variations thereof, are intended to include not only the exact amount or value that they qualify, but also some slight deviations therefrom, which may be due to computing tolerances, computing error, manufacturing tolerances, measurement error, wear and tear, stresses exerted on various parts, and combinations thereof, for example.

As used herein, any reference to "one embodiment," "an embodiment," "some embodiments," "one example," "for example," or "an example" means that a particular element, feature, structure or characteristic described in connection with the embodiment is included in at least one embodiment and may be used in conjunction with other embodiments. The appearance of the phrase "in some embodiments" or "one example" in various places in the specification is not necessarily all referring to the same embodiment, for example.

The use of ordinal number terminology (i.e., "first", "second", "third", "fourth", etc.) is solely for the purpose of differentiating between two or more items and, unless explicitly stated otherwise, is not meant to imply any sequence or order or importance to one item over another or any order of addition.

The use of the term "at least one" or "one or more" will be understood to include one as well as any quantity more than one. In addition, the use of the phrase "at least one of X, V, and Z" will be understood to include X alone, V alone, and Z alone, as well as any combination of X, V, and Z.

Circuitry, as used herein, may be analog and/or digital components, or one or more suitably programmed processors (e.g., microprocessors) and associated hardware and software, or hardwired logic. Also, "components" may perform one or more functions. The term "component," may include hardware, such as a processor (e.g., microprocessor), an application specific integrated circuit (ASIC), field programmable gate array (FPGA), a combination of hardware and software, and/or the like. The term "processor" as used herein means a single processor or multiple processors working independently or together to collectively perform a task.

A programming language is a set of commands, instructions, and other syntax used to create software. Languages that programmers use to write code are called "high-level languages." High-level language code, which is designed to be read and understood by programmers, is compiled into a "low-level language," which is recognized directly by the computer hardware as computer readable instructions. This allows programmers to write source code in a more natural fashion, using logical words and symbols. Examples of high-level languages include C++, Java, Perl, and PHP. Low-level languages include assembly and machine languages.

Software may include one or more computer readable instructions that when executed by one or more components cause the component to perform a specified function. It should be understood that the algorithms described herein may be stored on one or more non-transitory computer readable medium. Exemplary non-transitory computer readable mediums may include random access memory, read only memory, flash memory, and/or the like. Such non-transitory computer readable mediums may be electrically based, magnetically based, optically based, and/or the like. Software modules are reusable portions of computer executable code having one or more specific functions.

An Augmented Reality System includes a display device where projected environments generate images, sounds, and/or other sensations that augment, or supplement, a user's physical presence in a real-world environment, collectively referred to as an augmented environment, and may include an interface device wherein the user can provide input to the augmented environment. The Augmented Reality System may further include a processing component, a camera device, at least one trigger accessory, and any environmental stimulator configured to affect one of the senses of the user, such as, but not limited to, equipment configured to produce olfactory stimuli, orientation stimuli, or force stimuli. Augmented reality may be described as an interactive experience of a real-world environment where objects that reside in the real-world are enhanced by computer-generated perceptual information, sometimes across multiple sensory modalities, including visual, auditory, haptic, somatosensory and olfactory modalities. In one embodiment, augmented reality may be mixed reality, that is, a merging of real- and virtual-worlds to produce new environments and visualizations where physical and digital objects co-exist and interact in real time.

The at least one trigger accessory may be one or more portable accessory having at least one trigger icon and at least two or more predetermined configurations such as a shape or orientation. As will be discussed below, a first predetermined shape may correspond to a first entertainment mode and a second predetermined shape may correspond to a second entertainment mode. The first entertainment mode and the second entertainment mode may be two of a plurality of complementary components of an augmented reality entertainment system. In one embodiment, the trigger accessory may be any portable accessory as described above, such as a bracelet, anklet, arm band, leg band, head band, watch, ring, necklace, article of clothing, and/or the like.

In one embodiment, the trigger accessory is a slap bracelet, also referred to a snap bracelet, having at least one trigger icon, a first predetermined shape when the slap bracelet is curled in a wrapped form, and a second predetermined shape when the slap bracelet is fully extended in a substantially planar form. The slap bracelet may be similar in form to a spring steel wrapped in fabric with a coil feature, such as a bracelet sold under the trademark SLAP WRAP (Anders, Stuart, individual, Sun Prairie, Wis.). In one embodiment, the trigger accessory does not include embedded electronics, while in an alternative embodiment, the trigger accessory may include embedded electronics, for example an RFID chip to enable identification of a specific trigger accessory. While it is understood that the trigger accessory may be any portable accessory as described above, the specification will refer to the trigger accessory as a slap bracelet, not by way of limitation, but to provide a specific embodiment of a trigger accessory.

In one embodiment, the augmented reality environment may include an avatar, that is, a digital and/or virtual representation of the user, a part of the user, or a virtual extension of the user, within the augmented reality environment. The avatar is a digital and/or virtual representation that may be photorealistic or generic. The virtual extension of the user may be a representation of a device controlled by the user. In some embodiments, the avatar may move in a manner directed by the user. The avatar may further enhance the augmented environment by creating a more immersive experience for the user by providing visual feedback corresponding to a real-world situation of the augmented reality system.

The augmented reality environment may include a physics engine. A physics engine is a module of computer code that simulates physical and mass interactions for objects within the augmented reality environment. The physics engine may provide collision detection, that is, the physics engine may include a module of computer code that is used to determine whether a first object is intersecting a second object and raises events when the status of the intersection changes. For example, if the first object intersects the second object, collision detection may raise an entered event and when each of the first and the second objects no longer intersect, collision detection may raise an exited event. Each event may have one or more properties that may include location of the collision as well as the properties of each of the objects in the collision, such as object velocity, object mass, and object material. Additionally, the physics engine provides dynamics simulations, that is, simulations of forces acting on one or more objects within the augmented environment, such as but not limited to the force of gravity or the simulation of the mechanics of materials.

Referring now to FIG. 1, shown therein and designated by reference numeral 10 is an exemplary embodiment of an augmented reality entertainment system 10 in which a user 14 is associated with a trigger accessory 18. The trigger accessory 18 can be configured into at least a first predetermined shape. In some embodiments, the trigger accessory 18 has a first end 19 and a second end 20 (shown in FIG. 2). The augmented reality entertainment system 10 also includes a computing device 22. A trigger icon 26 is associated with, e.g., placed upon or supported by, the trigger accessory 18. The computing device 22 has a display 30, the display 30 depicts an augmented reality environment 34 in a first entertainment mode. The augmented reality environment 34 contains a plurality of digital objects comprising at least one digital object representative of an object in the real-world and at least one digital object representative of an object in the digital world. As shown in FIG. 1, the augmented reality environment 34 digitally depicts a digital user 14', a digital trigger accessory 18', and an avatar 38. Shown in FIG. 1 is an arm of the user 14 associated with the trigger accessory 18, however, the trigger accessory 18 may, in other embodiments, be associated with another portion of the user's person.

The trigger accessory 18 as shown in the exemplary embodiment in FIG. 1, is configured in the first predetermined shape, a wrap form wherein the trigger accessory 18 is wrapped around the user's wrist to cause the augmented reality environment 34 displayed by the computing device 22 to display the configuration mode. In one embodiment, the trigger accessory 18 is a slap bracelet having a rubberized coating and the trigger icon 26 is attached thereto. In this embodiment, the trigger icon 26 is printed and/or embossed on an exterior surface of the trigger accessory 18. In the embodiment depicted in FIG. 1, the trigger icon 26 is not physically attached to or include any electronic circuitry. In alternative embodiments, the trigger accessory 18 may be physically attached to or include electronic circuitry.

The trigger icon 26 is affixed to the trigger accessory 18 such that any movement of the trigger accessory 18 causes a corresponding movement of the trigger icon 26. The trigger icon 26 is an identifier of at least one entertainment mode. In one embodiment, the trigger icon 26 may be two-dimensional, for example, the trigger icon 26 may be printed or painted on the trigger accessory 18. In another embodiment, the trigger icon 26 may be three-dimensional, for example, the trigger icon 26 may be etched into the trigger accessory 18 or the trigger icon 26 may be affixed to a surface of the trigger accessory 18 and extend away from the trigger accessory 18.

In one embodiment, the computing device 22 is a cellular telephone device, such as a smart phone, described in more detail below. The computing device 22 has at least the display 30 as a visual feedback device, and an interface device 88, such as, by way of example only, a touch-screen component wherein the display is combined with the interface device 88 such that the user 14 may interact with the display 30 to interface with the computing device 22. In one embodiment, the interface device 88 is any human interface device. In other embodiments, the computing device 22 may be in communication with one or more interface device 88 providing an interface through which the user 14 may interact with the computing device 22 by, for example, a speech interaction, a noise interaction, a touch interaction, and/or a movement interaction near the computing device 22, either by the user 14 or by an environment in the real-world, movement of the computing device 22 or the trigger accessory 18 within the real-world, or other methods by which the user 14 may either directly or indirectly trigger an event by supplying a measurable stimulus to the computing device 22. In one embodiment, the display 30 and/or the computing device 22 include one or more of an auditory feedback device, a haptic feedback device, a somatosensory feedback device, and/or an olfactory feedback device.

Figure 2:
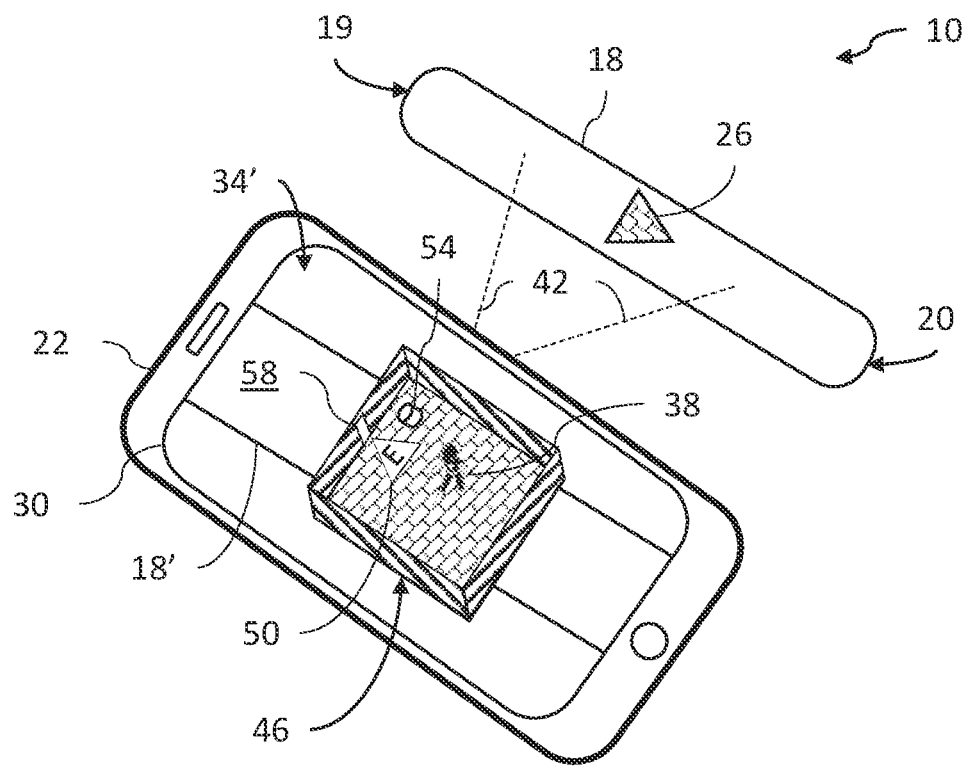
FIG. 2 is an exemplary embodiment of the augmented reality entertainment system of FIG. 1 in which the portable accessory of FIG. 1 is configured to place the augmented reality system in a play mode, which may also be referred to herein as a game mode.
Figure 3:
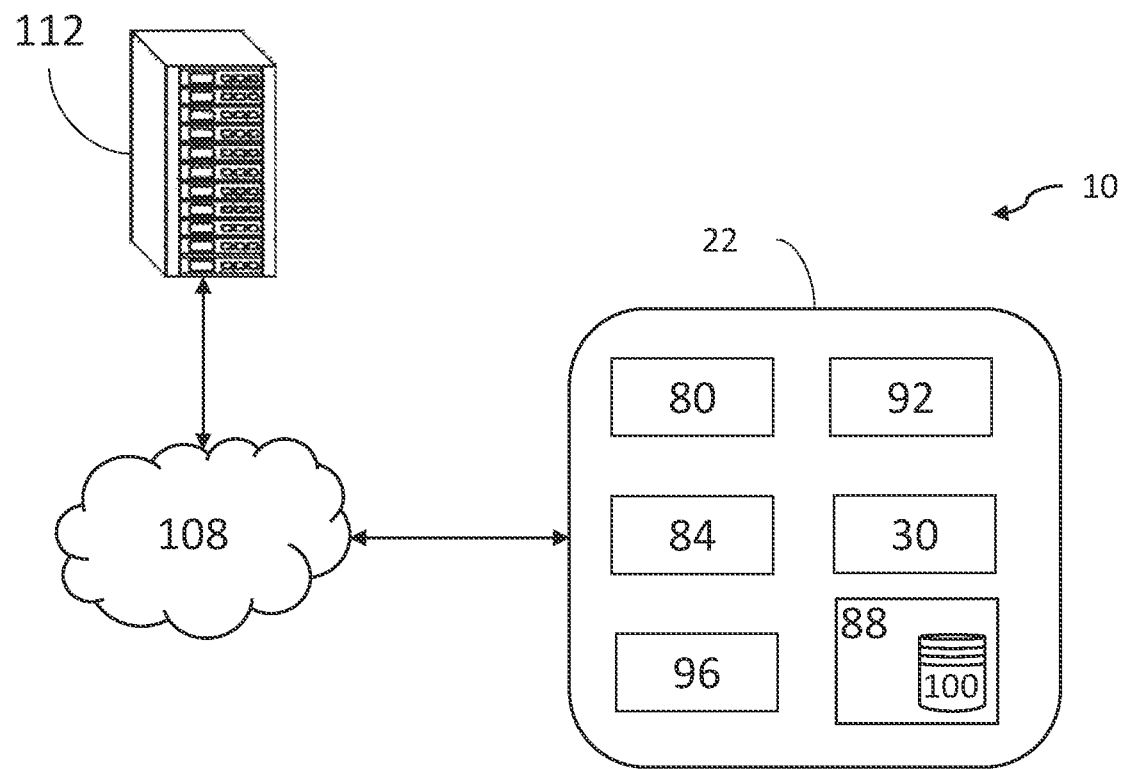
FIG. 3 is a block diagram of an exemplary embodiment of the augmented reality system constructed in accordance with the present disclosure.

The computing device 22 is in communication with at least one camera 92 (see FIG. 3). The camera 92 may capture one or more images from a video stream of a field of view 42 (FIG. 1 or FIG. 2) of the camera 92. The computing device 22 may include a processor 80 to analyze the at least one image captured by the camera 92 using image analysis to determine the trigger icon 26 and an orientation and configuration of the trigger accessory 18. The processor 80 of the computing device 22 generates the augmented environment 34 that is displayed on the display 30 and orients the augmented environment 34 based, at least in part, on the orientation and configuration of the trigger accessory 18. The configuration of the trigger accessory 18 may be determined based on the current shape of the trigger accessory 18 compared to each of the two or more predetermined shapes. In one embodiment, the computing device 22 determines the orientation of the trigger accessory 18 by analyzing the at least one image captured by the camera 92 and determining the orientation of the trigger icon 26. The camera 92 may be one or more image capture systems having a CMOS or CCD sensor to capture images and/or video streams of the real-world.

The augmented reality environment 34 may cause one or more signals to be transmitted to one or more feedback devices, thereby further augmenting the user's real-world environment. The augmented reality environment 34 depicts both a digital representation of real-world objects within the field of view 42, such as a digital user 14' and a digital trigger accessory 18' as well as a digital representation of virtual objects such as the avatar 38.

While the augmented reality entertainment system 10 may be utilized to provide other forms of entertainment, the augmented reality entertainment system described herein may be an augmented reality game system, such as, by way of example only, an augmented reality role playing game (the game). Features and modes of the augmented reality role playing game are described in more detail below.

As shown in FIG. 1, the trigger accessory 18 is configured in the first predetermined shape, thereby causing the processor 80 of the computing device 22 of the augmented reality entertainment system 10 to enter a first entertainment mode. In one embodiment, the augmented reality entertainment system 10 is configured to provide the user 14 with an augmented reality game. The first entertainment mode may be a configuration mode wherein the user 14 can "show-off" in-game accomplishments.

In one embodiment, the user 14 may activate the augmented reality game by interacting with the computing device 22 thereby causing the augmented reality game to be started. The user 14 may position the camera 92 such that the field of view 42 encompasses at least the trigger accessory 18 and the trigger icon 26, thereby causing the augmented reality game to recognize the first predetermined shape and enter the configuration mode. While in the configuration mode, the avatar 38 representing the user 14 is displayed on, above, or near the trigger icon 26, thereby mimicking a hologram attached to the user's wrist (or other part of the user's person) while viewed on the display 30.

While in configuration mode, the user 14 can modify their avatar 38 by changing one or more property of the avatar 38 such as the avatar's clothes or physical appearance. In one embodiment, the user 14 may acquire one or more avatars while playing the augmented reality game and can, while in configuration mode, switch between one or more avatars thereby changing the avatar's physical appearance. In one embodiment of the configuration mode, the user 14 may activate different animations and abilities available to the avatar 38 to watch the avatar 38 perform the activated animation and/or ability. For example, the user 14 may activate a dance animation which causes the avatar 38 to dance. Additional animations and/or abilities may include jumping, kicking, and/or other movements. The avatar 38 may perform one or more animation and/or ability of the avatar 38 within the game.

In one embodiment, the user 14 may utilize configuration mode to show other persons how far the user 14 has progressed within the game. Any changes made to the avatar 38 are saved to the user's profile and may be reflected in future representations of the avatar 38 in the configuration mode until the user 14 again changes the avatar's properties. In one embodiment, at least one of the avatar's properties must be unlocked within the game before the property becomes available for modification by the user. In yet another embodiment, at least one of the animations and the abilities must be unlocked within the game before the animation or ability becomes available for the user 14 to activate.

Each entertainment mode may be one or more software modules or subroutines configured to enable a different portion of the augmented reality game. In one embodiment, the first entertainment mode is implemented as a module of code configured to enable the processor 80 of the computing device 22 to enter and remain within the configuration mode whereas the second entertainment mode is configured to enable the processor 80 of the computer device 22 to enter and remain within a game mode. Additionally, as discussed in more detail below, the game mode may include one or more game worlds, each game world may comprise one or more software modules.

Referring now to FIG. 2, shown therein and designated by reference numeral 10 is an exemplary embodiment of the augmented reality entertainment system 10 having the trigger accessory 18 in a second predetermined shape being captured by the camera 92 of the computing device 22. An augmented reality environment 34', constructed similarly to the augmented reality environment 34 of FIG. 1, digitally depicts the digital trigger accessory 18', the avatar 38, a game block 46, a directional indicator 50, a first digital object 54 and a second digital object 58. Shown in FIG. 2 is an arm of the user 14 associated with the trigger accessory 18, however, the trigger accessory 18 may, in other embodiments, be associated with another portion of the user's person.

As shown in FIG. 2, the trigger accessory 18 is configured in the second predetermined shape, thereby causing the augmented reality entertainment system 10 to enter the second entertainment mode. The second entertainment mode may be the game mode wherein the user 14 can play the augmented reality game. The user 14 may position the camera 92 such that the field of view 42 encompasses at least the trigger accessory 18 and the trigger icon 26, thereby causing the augmented reality game to recognize the second predetermined shape and enter the game mode. When the trigger accessory 18 is configured in the second predetermined shape, the trigger accessory 18 may be placed on a surface, thereby freeing both of the user's hands to operate the computing device 22.

In one embodiment, the user 14 may play the augmented reality game by interacting with an interface device 88, such as the interface device 88 of the display 30 described in more detail above, in communication with the computing device 22 thereby affecting the augmented reality environment. While in the game mode, the avatar 38 representing the user 14 is displayed within the game block 46. The game block 46 is displayed on, above, or near the trigger icon 26, thereby mimicking a hologram of the game block 46 and any digital object therein associated. Game mode allows the user 14 to explore a game world, collect objects, solve puzzles, accomplish tasks, defeat enemies, and/or other activities associated with a role-playing style gaming environment. The game block 46 may include the directional indicator 50 to provide the user an indication of the avatar's direction of travel. The game block 46 may further include one or more digital objects such as a door object 58 and digital object 54. In one embodiment, the user 14 may cause the avatar 38 to interact with one or more digital object 54 thereby causing the user 14 to collect the digital object 54 as a collected item. In one embodiment, whether an digital object 54 is shown, or whether the digital object 54 is collectable, may be dependent on one or more of the avatar 38 being used, one or more avatar property, one or more avatar ability, and/or the like.

For example, only, in one embodiment, where the door object 58 is locked, the user 14 may need to solve a puzzle to unlock the door object 58. This may be accomplished by interacting with the augmented reality environment 34' and/or objects within the digital environment such as the digital object 54. For example, the user 14 may need to interact with the augmented reality environment 34' in a particular manner to collect a digital object 54, such as a key object, before the door object 58 is unlocked. In one embodiment, interaction with the augmented reality environment 34' and/or other objects within the digital environment may be dependent on one or more ability of the avatar 38. For example, if the game block 46 includes a stage object, the avatar 38 may interact with the stage object using a particular dance ability, as described above. If the avatar 38 does not include the particular dance ability, the avatar 38 cannot interact with the stage object to cause the avatar 38 to dance on the stage object; however, attempting to interact with the stage object may cause a notification to be presented on the display 30 alerting the user 14 that in order to interact with the stage object, the avatar 38 needs a dance ability.

Figure 4:
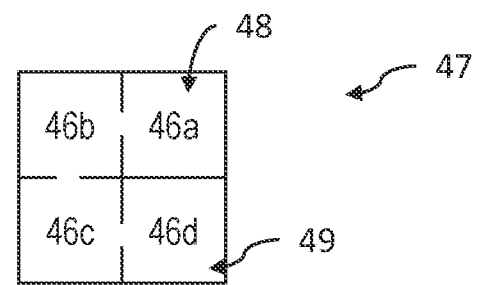
FIG. 4 is a diagram of a game world constructed in accordance with the present disclosure.

In one embodiment, as shown in FIG. 4, the augmented reality game in game mode, may provide a game world 47 comprising one or more game block 46a-n. The game world 47 may be organized into a grid wherein each game block 46a-n is adjacent to and accessible by at least one other game block 46a-n. In one embodiment, the game world 47 has a start position 48 and a finish position 49 within the grid and one or more game blocks 46a-n connect together to form one or more contiguous path wherein at least one contiguous path connects the start position 48 to the finish position 49, for example, a contiguous path going from the start position 48 in game block 46a to game block 46b, to game block 46c to the finish position 49 in game block 46d.

In one embodiment, the grid has cardinal directions such as North, South, East, and West. At least one direction may be displayed within the directional indicator 50.

In one embodiment, the user 14 may cause the avatar 38 to interact with the augmented reality environment, one or more digital object 54 within the augmented reality environment 34', and/or move around the augmented reality environment 34'. For example only, when the user 14, being in a first game block, goes in a first direction to an edge of the first game block, such as a wall having the door object 58, a second game block adjacent to and contiguous with the first game block on the grid and in the first direction is displayed on the display 30. In this manner, the user 14 may explore the game world in a systematic way, e.g., from one game block 46 to another game block 46. It should be understood that the one game block 46 and the other game block 46 can be adjacent within the grid, or non-adjacent within the grid (e.g., teleporting within the grid). In one embodiment, the cardinal direction of the grid may or may not align to the cardinal directions of the real-world.

Each game block 46 is a three-dimensional representation of a specific location within the game world, or grid of the game world. A current game block 46, that is, a game block 46 that is displayed within the augmented environment, may appear to be three-dimensional. The augmented reality game may include a software module that orients the current game block 46 to a specific direction corresponding to a position of the trigger accessory 18 in relation to the camera 92. In this way, the user 14 may physically manipulate the trigger accessory 18 in either two dimensions (e.g. rotating about a substantially common axis, moving sideways, back and forth, etc.) or within three dimensions. For example, the user 14 may physically manipulate the trigger accessory 18, such as by rotating the trigger accessory 18 from a first position to a second position, and such may be interpreted by the software module to permit the user 14 to view every portion of the game block 46. In another embodiment, the user 14 may physically manipulate the camera 92 relative to the trigger accessory 18 and such may be interpreted by the software module to permit the user 14 to view portions of the game block 46.

In one embodiment, depending on an orientation of the avatar 38 when the avatar 38 enters a particular game block 46, the software module may obscure a portion of the particular game block 46 with one or more walls of the particular game block 46 thereby obscuring one or more digital objects needed to continue. Such digital objects may include software modules that provide switches and/or puzzles within the augmented reality environment 34.

For example only and not by way of limitation, a specific game block 46 may have a secret switch on a wall facing away from the user 14 from the point of view of the user 14 when the avatar 38 enters the specific game block 46. In order to permit the user 14 to find the secret switch, the software module detects rotation of the trigger accessory 18 relative to the camera 92, or movement of the camera 92 relative to the trigger accessory 18 to permit viewing of the secret switch. When the trigger accessory 18 is rotated relative to the camera 92, the software module is configured to maintain alignment of the specific game block 46 with the trigger icon 26 to rotate the specific game block 46 with the trigger accessory 18. The user 14 may rotate the trigger accessory 18 relative to the camera 92 until a backside of the wall is facing the user 14 thereby enabling the user 14 to view the secret switch. In this way, the augmented reality game may require manipulation of the trigger accessory 18 or camera 92 relative to the trigger accessory 18 for successful play. In one embodiment, the user 14 may collect one or more skills, character outfits, animations, abilities, and/or the like.

In one embodiment, the camera 92 may be at an orthogonal position above the trigger icon 26 such that the camera 92 may obtain one or more nadir images of the trigger icon 26. In other embodiments, the camera 92 may be at an oblique position relative to the trigger icon 26 such that the camera 92 may obtain one or more oblique images of the trigger icon 26. In one embodiment, the trigger icon 26 must be within the field of view 42 of the camera 92 in order for the computing device 22 to display the game block 46 over the trigger icon 26 shown in the display 30. If the trigger icon 26 is removed from the field of view 42 of the camera 92, the computing device 22 will remove the game block 46 from the display 30, however, the game block 46 will again be displayed on the display 30 once the trigger icon 26 re-enters the field of view 42 of the camera 92.

In one embodiment, progress the user 14 has made while playing the game may be saved non-transitorily to a save file, such as in a memory 84, shown in FIG. 3 and described in more detail below. The save file may be used by the augmented reality game to determine and maintain the progress of the user 14 and may be used to determine which game block 46 the user 14 should enter when the user 14 starts the game. The save file may also record the properties the user 14 has set on the avatar 38. The augmented reality game may continuously or periodically save the user's current game to the save file. The augmented reality game may maintain the save file such that the save file saves the progress of the user 14 in each of the plurality of game worlds and allows the user 14 to maintain a single set of collected items, activities, accessories, and/or animations accessible by the user 14 in each of the plurality of game worlds and accessible in play mode and/or configuration mode, thereby extending the augmented reality game to include each of the plurality of game worlds corresponding to the plurality of trigger accessories 18.

In one embodiment, the augmented reality game requires the use of a plurality of trigger accessories 18 in order for the user 14 to successfully complete the game. In one embodiment, the trigger accessory 18 includes an indicator corresponding to one of a plurality of game worlds each game world having its own augmented environment. The indicator may be incorporated in the trigger icon 26 or may be affixed to the trigger accessory 18 in addition to the trigger icon 26. For example, the indicator may be a color of the trigger accessory 18, an indicator icon affixed to the trigger accessory 18, or otherwise associated with the trigger accessory 18.

In one embodiment, the user 14, playing within a first game world, reaches a point in which the user 14 needs an item from a second game world. The user 14 may open a menu displayed within the augmented reality environment 34' and select the second game world from the menu. The user 14 must then select a second trigger accessory 18 having an indicator corresponding to the second game world and position the second accessory in the second predetermined shape and within the field of view 42 of the camera 92 in order to enter the second game world in game mode.

In some embodiments, the software of the computing device 22 does not require any particular order in which the user 14 can access and play the game worlds by placing a particular one of the trigger accessories 18 within the field of view of the camera 92. Thus, the user 14 can decide which game world to play at any particular time, and still participate in playing the game. In this sense, the game may be said to be "non-linear", that is, the user 14 does not have to follow a predetermined path through the game, but has autonomy to decide which of the trigger accessories 18 to play at any point of the game.

In one embodiment, the trigger accessory 18 may be a character trigger accessory constructed in accordance with the trigger accessory 18 as described above in more detail. The character trigger accessory may include the first entertainment mode as the configuration mode and the second entertainment mode as the game mode, as described above. The game made of the character trigger accessory may include a game world formed by or comprising one or more software modules wherein the user 14 can play the augmented reality game in order to obtain a new avatar 38. As described above, the user 14 may acquire one or more avatar while playing the augmented reality game. In this embodiment, the character trigger accessory may provide the game mode independent of the game mode of any other trigger accessory 18 and, upon completion of the game mode of the character trigger accessory, the new avatar 38 may become available to the user 14 in configuration mode of either the character trigger accessory or any other trigger accessory 18.

In one embodiment, where the trigger accessory 18 is the character trigger accessory, the user 14 may unlock at least one avatar property before that avatar property becomes available to the user, such as by completing at least a portion of the augmented reality game in the game mode of the character trigger accessory. In one embodiment, the avatar property is a preconfigured three-dimensional style of the avatar 38 such as an appearance of the avatar 38 or a set of clothes for the avatar 38

For example, if the character trigger accessory is a Hatsune Miku character trigger accessory, then the user 14, upon completion of at least a portion of the augmented reality game in the game mode of the Hatsune Miku character trigger accessory, may unlock and acquire a Hatsune Miku avatar having the physical appearance of Hatsune Miku. The Hatsune Miku avatar may include one or more avatar property such as clothing, abilities, animations, or the like. The Hatsune Miku avatar may be saved to the user's profile such as within the save file associated with the memory 88. In one embodiment, the Hatsune Miku avatar has an avatar property and/or an ability that enables the Hatsune Miku avatar to interact with one or more digital object 54 with which a different avatar 38 cannot interact.

In one embodiment, the augmented reality game supplies special missions available to the user 14. At various times, special objectives are added to the augmented reality game that may correlate to real-world prizes. For example, during Christmas, a particular digital object 54 may be a three-dimensional Santa Clause digital object may be placed within the game. The first user 14 to locate the three-dimensional Santa Clause digital object may win a prize in the real-world. In one embodiment, the prize is, for example, the user 14 having the opportunity to be three-dimensionally modeled and become a character digital object, or avatar 38, within the game, that is, the user's likeness becomes a character or avatar within the game. Alternatively, a user 14 who locates the three-dimensional Santa Clause digital object but is not the first to do so may receive another prize such as a t-shirt, a poster, and/or other marketing material.

Referring now to FIG. 3, shown therein is a block diagram of exemplary embodiment of an augmented reality entertainment system 10. The augmented reality entertainment system 10 generally comprises the computing device 22 having at least the processor 80, a non-transitory computer readable medium 84 (memory), the interface device 88, the camera 92, and the display 30. In one embodiment, the augmented reality environment 34 and the augmented reality environment 34' are each a set of one or more computer executable instructions stored in the memory 84 and carried out by the processor 80.

The computing device 22 may include (or be communicatively coupled with) one or more communication component 96. The non-transitory memory 84 may store computer code that implements the augmented reality entertainment system 10. The memory 84 may further store the save file or may save the save file in one or more database 100. The augmented reality entertainment system 10 may include a network 108 enabling bidirectional communication between the computing device 22 and/or a server system 112. The processor 80 or multiple processors 80 may or may not necessarily be located in a single physical location.

In one embodiment, the network 108 is the Internet. It should be noted, however, that the network 108 may be almost any type of network and may be implemented as the World Wide Web (or Internet), a local area network (LAN), a wide area network (WAN), a metropolitan network, a wireless network, a cellular network, a Bluetooth network, a Global System for Mobile Communications (GSM) network, a code division multiple access (CDMA) network, a 3G network, a 4G network, a 5G network, a satellite network, a radio network, an optical network, a cable network, a public switched telephone network, an Ethernet network, combinations thereof, and/or the like. It is conceivable that in the near future, embodiments of the present disclosure may use more advanced networking topologies.

In one embodiment, the network enables the computing device 22 to connect to the server system 112 wherein the computing device 22 is able to download updates such as new special missions, missions related to current game world events, and/or missions related to current real-world events. By providing updates, users may be encouraged to be engaged and active within the augmented reality environment 34 and/or the augmented reality environment 34' even if the users have completed the game worlds initially available as determined by the trigger accessories 18. Updated game worlds and/or new game worlds may be associated with one or more of the trigger icon(s) 26 on the trigger accessory(s) 18. In one embodiment, the update is available based, in part, on the user's progress within the augmented reality game. In one embodiment, an update is accessible to the user 14 when the user 14 is using a particular avatar 38 and/or the avatar 38 used by the user includes one or more particular avatar property and/or ability. The server system 112 may include one or more server in communication with another serer and located at the same or different physical location as described below.

In one embodiment, the network 108 enables the computing device 22 to connect to a second computing device 22 to allow the augmented reality game to be played by the user 14 using the computing device 22 and a second user 14 using the second computing device 22 wherein both users 14 can play the same augmented reality game in game mode, which may be referred to as cooperation game mode, or co-op game mode. By connecting to the second computing device 22, the computing device 22 displaying the game block 46 may display the user's avatar 38 along with a second avatar 38 directed by the second user 14 at the same time, thereby enabling the user 14 and the second user 14 to simultaneously play the game. While in co-op game mode, the user 14 and the second user 14 may open secret areas or unlock additional activities, animations, and/or other avatar properties otherwise unavailable when playing the game without another user, e.g., in a mode other than in co-op game mode.

In another embodiment, the network 108 enables the computing device 22 to connect to a second computing device 22 to allow the augmented reality game to be played by the user 14 using the computing device 22 and a second user 14 using the second computing device 22 wherein both users 14 can play the same augmented reality game in configuration mode. When the computing device 22 is connected to the second computing device 22 and the augmented reality game is in configuration mode, the users can connect to the same augmented reality environment 34 where the users' avatars 38 can battle each other and each computing device 22 displays a synchronized augmented reality environment 34 on the display(s) 30. In another embodiment, when the avatars 38 are battling, the trigger accessories 18 may act as an activator for the synchronized augmented reality environment 34 and the computing devices 22 may use SLAM AR technology so the users 14 can "place" their respective avatar 38 on a surface for the battle.

In one embodiment, the computing device 22 having the processor 80 and the non-transitory memory 84 may be implemented with the server system 112 having multiple servers in a configuration suitable to provide a commercial computer-based business system such as a commercial website and/or data center.

From the above description and examples, it is clear that the inventive concepts disclosed and claimed herein are well adapted to attain the advantages mentioned herein. While exemplary embodiments of the inventive concepts have been described for purposes of this disclosure, it will be understood that numerous changes may be made which will readily suggest themselves to those skilled in the art and which are accomplished within the spirit of the inventive concepts disclosed and claimed herein.

What is claimed is:

1. A non-transitory computer readable medium storing computer executable code that when executed by at least one processor cause the at least one processor to:
   obtain at least one image of a first trigger accessory within a field of view of a video stream during a period in which the video stream is being obtained by a camera having a field of view directed at the first trigger accessory and the at least one processor is executing an augmented reality game requiring visual input from the first trigger accessory to enable a user to play a game provided by the augmented reality game, the game having a first augmented reality environment associated with the first trigger accessory, and a second augmented reality environment associated with a second trigger accessory;
   collect and non-transitorily store a first data associated with the user playing the game within the first augmented reality environment;
   access the first data when the user is playing the game within the second augmented reality environment; and
   modify the game within the second augmented reality environment based upon the first data.

2. An augmented reality entertainment system, comprising:
   a first trigger accessory having a first trigger icon;
   a second trigger accessory having a second trigger icon; and
   a computing device comprising:
      at least one processor,
      a camera having a field of view and configured to provide a video stream;
      a non-transitory computer readable medium storing computer executable code that when executed by the at least one processor causes the at least one processor to:
         obtain at least one first image of the first trigger icon within the field of view of the video stream during a period in which the video stream is being obtained by the camera having the field of view directed at the first trigger icon and the at least one processor is executing an augmented reality game requiring visual input from the first trigger icon to enable a user to play a game provided by the augmented reality game, the augmented reality game having a first augmented reality environment associated with the first trigger icon, and a second augmented reality environment associated with the second trigger icon;
         collect and non-transitorily store a first data associated with the user playing the augmented reality game within the first augmented reality environment;
         obtain at least one second image of the second trigger icon within the field of view of the video stream during a period in which the video stream is being obtained by the camera having the field of view directed at the second trigger icon and the at least one processor is executing the augmented reality game requiring visual input from the second trigger icon to enable the user to play within the second augmented reality environment of the augmented reality game;
         access the first data when the user is playing the augmented reality game within the second augmented reality environment; and
         modify the augmented reality game within the second augmented reality environment based upon the first data.

3. The augmented reality entertainment system of claim 2, wherein the first trigger accessory is a bracelet.

4. The augmented reality entertainment system of claim 2, wherein the first trigger icon is printed or embossed on the first trigger accessory.

5. The augmented reality entertainment system of claim 2, wherein the second trigger icon is printed or embossed on the second trigger accessory.

6. The augmented reality entertainment system of claim 2, further comprising a display in communication with the computing device, wherein the computing device causes the display to show the augmented reality game.

7. The augmented reality entertainment system of claim 6, further comprising an interface operable to receive one or more instruction from a user wherein the interface is in communication with the computing device.

8. The augmented reality entertainment system of claim 7, wherein the display and the interface are integrated into the computing device.

9. The augmented reality entertainment system of claim 2, wherein the first trigger accessory has at least a first predetermined shape or a second predetermined shape and wherein the non-transitory computer readable medium further includes computer executable code that when executed by the at least one processor causes the at least one processor to further obtain at least one third image of the first trigger accessory within the field of view of the video stream during the period in which the video stream is being obtained by the camera having the field of view directed at the first trigger accessory and the at least one processor is executing an augmented reality game requiring visual input from the first trigger accessory having either the first predetermined shape or the second predetermined shape to enable the user to play the game provided by the augmented reality game, the augmented reality game having a third augmented reality environment associated with the first predetermined shape, and a fourth augmented reality environment associated with the second predetermined shape.

10. The augmented reality entertainment system of claim 9, wherein the first augmented reality environment and the second augmented reality environment are different.

11. The augmented reality entertainment system of claim 9, wherein the third augmented reality environment and the fourth augmented reality environment are different.

* * * * *